Nov. 5, 1946.  T. H. WICKWIRE, JR  2,410,766
APPARATUS FOR FABRICATING WELDED WIRE FABRIC
Filed June 18, 1943  3 Sheets-Sheet 3

Patented Nov. 5, 1946

2,410,766

UNITED STATES PATENT OFFICE 2,410,766

APPARATUS FOR FABRICATING WELDED WIRE FABRIC

Theodore Harry Wickwire, Jr., Ardmore, Pa., assignor to Theodore Harry Wickwire, Jr., Sophie H. Wickwire, Roma A. Wickwire, and Hedge Wickwire, doing business as a copartnership under the name of Theowick Company, Philadelphia, Pa.

Application June 18, 1943, Serial No. 491,270

11 Claims. (Cl. 140—112)

My invention relates to an improved apparatus for fabricating welded wire fabric.

Heretofore it has been necessary to interrupt the feeding of the fabric during the actual welding of the transverse wires to the longitudinal strands. One of the objects of my invention is to make it possible to use a continuous feed of the fabric, the welding being performed between rotating welding wheels.

Another object of my invention is to provide an improved feeding arrangement for bringing the transverse wires into position for welding, the arrangement being such that the spacing between the transverse wires may be varied in order to produce a fabric of desired mesh.

A still further object of my invention is to make it possible to employ a single electric transformer for furnishing the current necessary for welding the transverse wires to a plurality of strands. Heretofore, it has been necessary to provide a separate transformer for each strand due to the fact that the welds between the transverse wire and the strands have been made simultaneously and, if the welding points had been connected in parallel across the leads of a single transformer, there would have been an unequal distribution of current between the different welds due to the impossibility of avoiding different resistances. In accordance with one embodiment of my invention the welds between a single transverse wire and a plurality of longitudinal strands may be made successively, whereby the entire output of the transformer is employed for each weld.

Further objects and advantages of my invention will be apparent from the following description considered in connection with the accompanying drawings, which form a part of the specification, and of which:

Fig. 1 is a top view of another embodiment of my invention.

Figure 1:
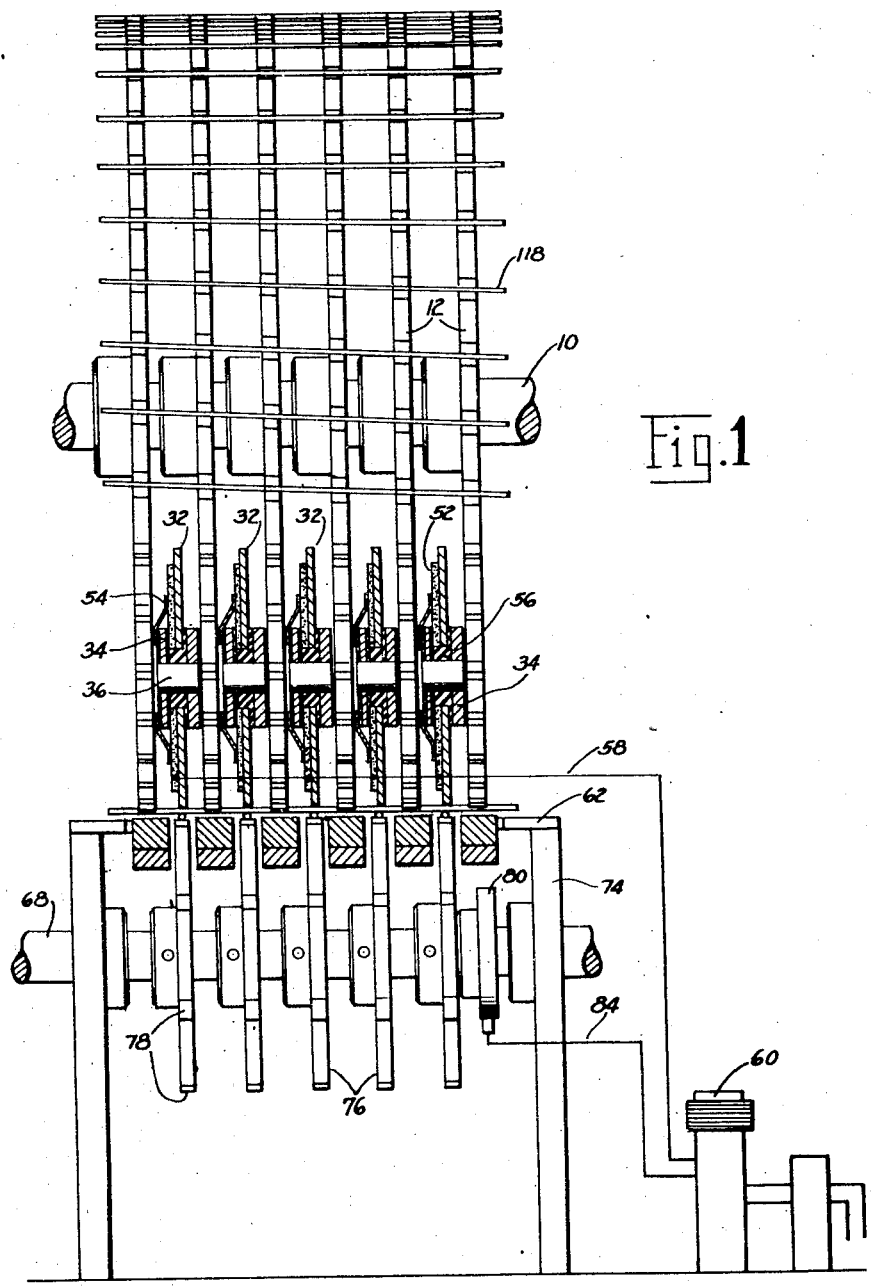
Fig. 1 is a front view, partially in cross-section, of an apparatus in accordance with my invention, certain driving elements having been omitted for the sake of simplicity.
Figure 2:
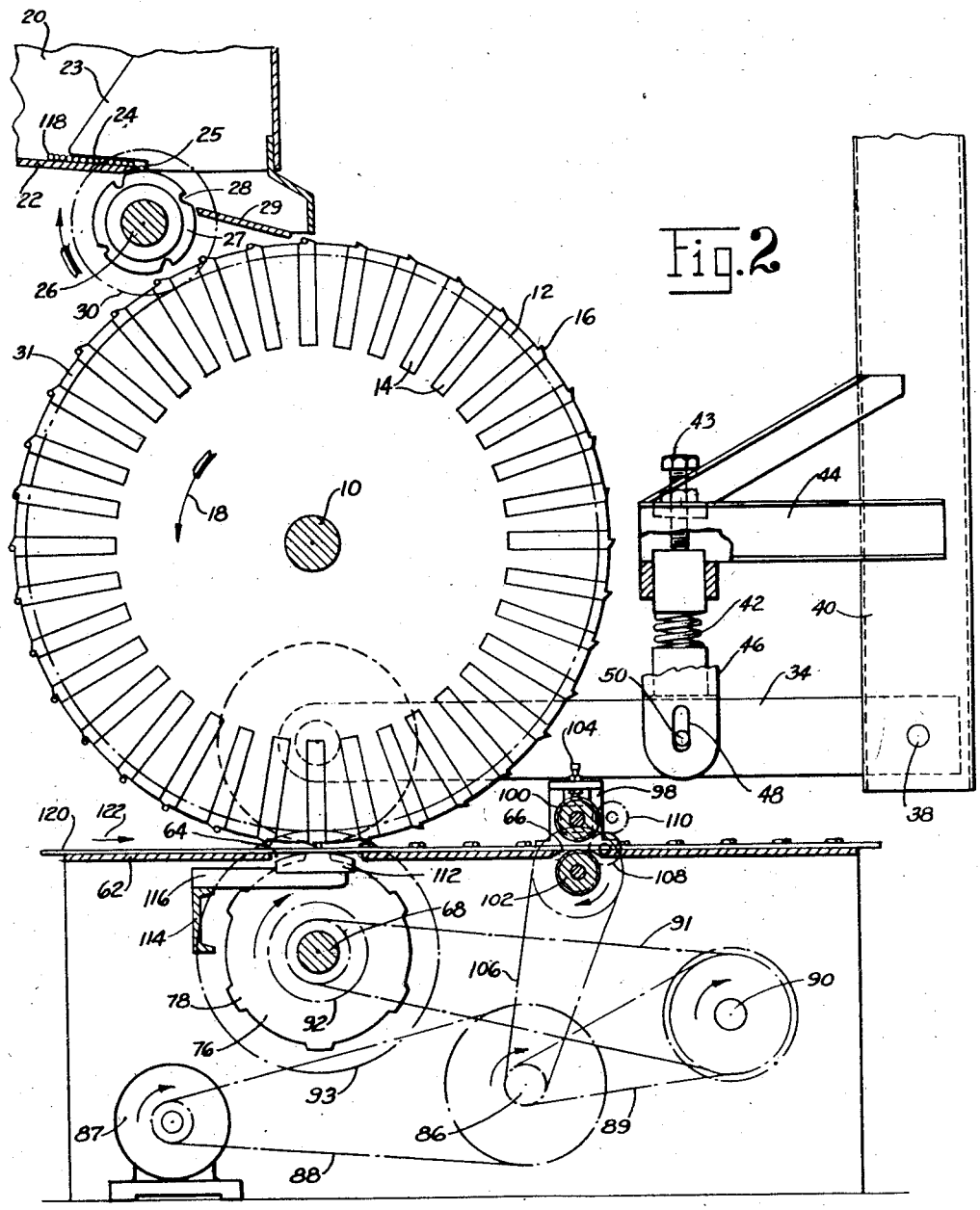
Fig. 2 is a side view of the apparatus shown in Fig. 1, the above referred to driving elements being shown.
Figure 3:
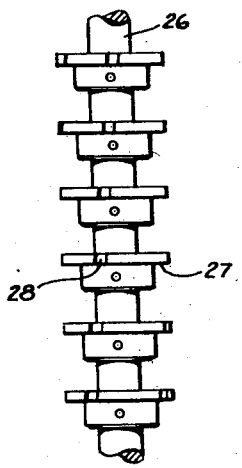
Fig. 3 is a top view on an enlarged scale of a portion of the apparatus illustrated in the preceding figures.

Referring more particularly to Figs. 1 through 3, reference character 10 designates a rotatably mounted shaft to which is secured a feeding drum comprising a plurality of axially spaced wheels 12. Each wheel carries a plurality of magnets 14, which may be either permanent or electromagnets. The radially outer end of each magnet is formed with a projecting portion 16 which extends slightly beyond the periphery of the wheel, forming a shoulder on the forward edge of the projection, the wheel rotating in a counter-clockwise direction as indicated by the arrow 18. Suitably supported above the wheel 12 is a feed hopper 20 having an inclined bottom 22 which is adapted to retain a supply of transverse wires. One or more transverse plates 23 are disposed lengthwise in the lower end of hopper 20. Each plate has a lower edge 24 which is parallel to and spaced from the inclined bottom 22 a distance slightly greater than the diameter of the transverse wires, which assures that the wire lies in a single layer. At a similar distance beyond the lower edge of bottom 22 each plate is formed with a shoulder 25. A rotatably mounted shaft 26 carries a plurality of transfer wheels 27, each wheel being formed with a plurality of notches 28 in its periphery. As clearly shown in Fig. 3, the several wheels are fixed to shaft 26 so that the notches 28 are progressively staggered. Shaft 26 is so located that the clearance between the peripheries of wheels 27 and the lower edges of bottom 22 and shoulder 25 is less than the diameter of a transverse wire. The upper end of an inclined plate 29 is disposed close to the peripheries of wheels 27 slightly above the horizontal radii of the wheels, the lower end of the plate terminating just above the wheels 12 near the vertical radii of the latter. Shaft 26 is driven by shaft 10 through gears 30 and 31, the ratio being equal to the number of magnets 14 in each wheel 12 divided by the number of slots 28 in each wheel 27.

Arranged between adjacent wheels 12 is a plurality of upper welding wheels 32. Each wheel is rotatably mounted in the forked end of a pivoted lever 34 by means of a short shaft 36. The several levers 34 are pivoted at 38 to a suitable support 40. The levers are urged downwardly by means of springs 42 acting between fixed arms 44 and the levers. Members 46 are secured to arms 44 and are provided with slots 48 near their lower ends in which extend pins 50 secured to the levers 34. Thus, the members 46 and the pins 50 serve to limit the downward movement of the levers 34 under the influence of springs 42.

The welding wheels 32 are preferably made of a good conductor of electricity, such as copper, and adjacent each wheel there is located a disc of carbon 52 or other material suitable for serving as a brush to transmit current to the adjacent welding wheel. The brush discs 52 are urged into contact with the welding wheels 32 by means of springs 54. Suitable bushings 56 of insulating material are provided between the arms 34 and the shafts 36, on the one hand, and the welding wheels 32 and the brush discs 52, on the other hand, so as to prevent transmission of current to the arm 34. Each of the brush discs 52 is connected in a suitable manner to a conductor 58 which is connected to one terminal of a suitable transformer 60.

Disposed beneath the feeding wheels 12 and the welding wheels 32 is a bed plate 62 provided with a slot 64 extending for a short distance on either side of the vertical center line of the feeding drums, and with a slot 66 disposed to one side thereof.

A shaft 68 is rotatably mounted in a frame 74 which serves to support the bed 62. A plurality of lower welding wheels 76 are mounted on the shaft 68. The periphery of each wheel is formed with a plurality of projections 78. Also mounted on the shaft 68 is a slip-ring 80 which cooperates with a brush connected by means of a conductor 84 with the other terminal of transformer 60.

Rotatably mounted in the frame 74 is a jack shaft 86 which carries a plurality of sprocket wheels. One of these wheels is driven by an electric motor 87 through a chain 88. Another sprocket on shaft 86 drives a chain which engages a sprocket on a second jack shaft 90. This shaft carries a sprocket which drives a chain 91 which engages a sprocket 92 secured to shaft 68. A gear 93 is mounted on shaft 68 and meshes with gear 31 on shaft 10. The transmission ratio between shafts 10 and 68 is equal to the number of magnets 14 on each wheel 12 divided by the number of raised portions 78 in each welding wheel 76.

Secured to the bed 62 in alignment with the slot 66 therein is a standard 98 which carries a pair of feed rollers 100 and 102. The bearings for rollers 100 are vertically displaceable in the standard 98 and are urged downwardly by means of a spring the tension of which may be adjusted by means of a setscrew 104, while the bearings for the roller 102 are fixed. Roller 102 is driven by a suitable chain or belt drive 106 from the shaft 86 and a pair of gears 108 and 110 are provided for transmitting rotary motion from the roller 102 to the roller 100.

A plurality of permanent or electro-magnets 112 are supported from a channel 114 by means of arms 116. These magnets 112 extend into the slots 64 in the bed 62 in alignment with the feeding wheels 12. Each magnet 112 produces a magnetic pull substantially equal to that produced by each of the magnets 14.

The operation of the above described device is as follows:

A plurality of wires 118, pre-cut to the correct length to form the transverse wires of the fabric, are placed in the feed hopper 20. Due to the inclination of the bottom 22 of the hopper these wires tend to slide or roll downwardly, but the plates 23 assure that the wires lie in a single layer at the lower end of the bottom 22. One wire at a time drops into the space between the end of the bottom 22, the shoulder 25 and the peripheries of wheels 27, where it remains until, during rotation of the wheels, it drops into the notches 28. Inasmuch as the notches in the several wheels are progressively staggered, the wire is disposed at an angle to the shaft 26, and in this position is carried around by the rotation of the wheels through an angle of a little less than 90°, whereupon it leaves the notches under the influence of both gravity and centrifugal force, and falls on the inclined plate 29. It slides or rolls down this plate, still at an angle, and is deposited across the feed wheels 12 to which it is held by means of the magnets 14. The rotation of wheels 27 is so timed with respect to the rotation of wheels 12, that a wire is deposited thereon just as a magnet 14 is passing below the end of plate 29.

The wire 118, held in position at the ends of the magnets 14, is carried around by the rotation of the drum. At the same time a plurality of strands of wire 120 are fed in the direction of the arrow 122 along the bed 62 by means of the feed rollers 100 and 102. As the transverse wire 118 is carried around by the feeding wheels 12, it is brought into contact with strands 120, at the same time that a projection 78 on a welding wheel 76 contacts a strand so as to force the transverse wire 118 and the strand 120 into pressure contact with each other between the upper and lower welding wheels. The pressure exerted between each pair of welding wheels can be adjusted as desired by the spring adjustment 43 which is also used to properly set the machine to accommodate the different wire sizes used to make fabrics of different weights and strength. However, due to the fact that the transverse wire is maintained at an angle with respect to the axis of the welding wheels, due to the staggered relationship of the magnets 14, it will be pressed between the different pairs of upper and lower welding wheels successively. As the wires are pressed between each pair of welding wheels, the current flows from one wheel to the other through the wires to effect an electric weld. Inasmuch as the welds between the transverse wire and the several strands 120 take place successively, the entire current output of the transformer is available for each weld and there is no danger of unequal distribution of the current between different welds. Consequently, welds of a uniform nature are obtained.

The magnets 112 serve to counteract the attraction of the magnets 14 and consequently serve to strip the transverse wires from the feeding wheels, thus eliminating any tendency for the transverse wires and the strands 120, to which they are now welded, from being pulled upwardly away from the bed 62.

Inasmuch as the bearings carrying the feed roller 100 are vertically displaceable, this roller may move upwardly a slight distance in order to permit the cross wires 118 to pass thereunder.

Figure 4:
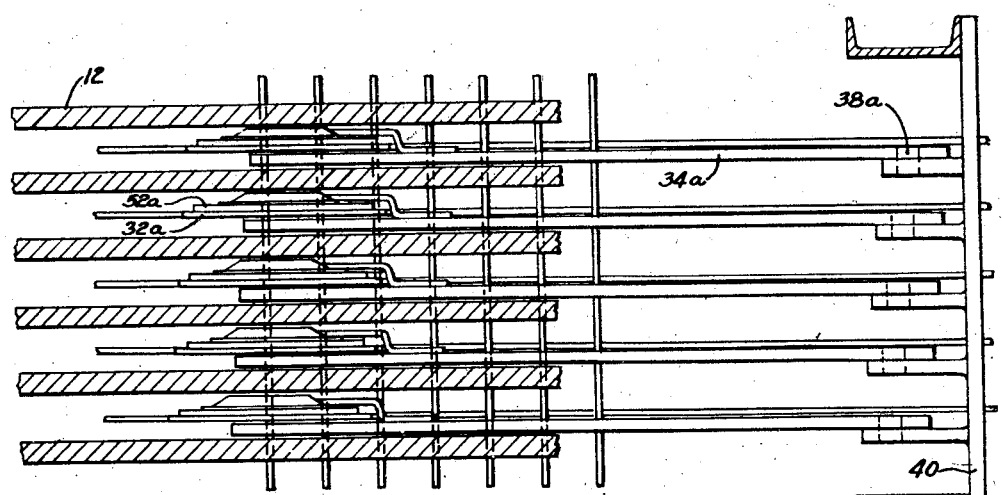

Instead of having the transverse wires retained at an angle on the carrier wheels, they may be held thereon parallel to its axis of rotation, while the pairs of the upper and lower welding wheels are offset so that only one pair engages the wires to be welded at a time. Such an arrangement is shown in Fig. 4. The upper welding wheels 32a and the brush discs 52a are rotationally mounted on forked arms 34a which are pivoted at 38a to a support 40. The arms 34a as shown are all of the same length, but the several pivot points 38a are offset with respect to each other and with the result that the several welding wheels 32a are likewise offset. The lower welding wheels, corresponding to wheels 76 in Figs. 1 and 2, are also offset by a similar amount. Consequently, the different pairs of welding wheels will engage the wires to be welded at successive instants, whereby no two welds are made at the same instant and consequently the entire output of the transformer is available for each weld.

Obviously, if it is desired to use a separate transformer for each pair of welding wheels, the magnets 14 in Fig. 2 may be in alignment on the different wheels 12 so that the transverse wires are held parallel to the axis of rotation. In any case, the strands 120 may be fed continuously and it is not necessary to interrupt their movement along the bed while the welding is taking place. This not only results in a more rapid fabrication but eliminates mechanism which would otherwise be required to start and stop the feed.

While I have shown and described several embodiments of my invention it is to be understood that this has been done for the purpose of illustration only and that the scope of my invention is not to be limited thereby, but is to be determined from the appended claims. Certain novel features of the method disclosed herein, but not claimed, form the claimed subject matter of my copending divisional application Serial No. 601,400 filed June 25, 1945.

What is claimed:

1. In a machine for fabricating welded wire fabric, a plurality of pairs of welding wheels, means for feeding a wire strand between the wheels of each pair, said pairs of welding wheels being in alignment on a line extending at right angles to said strands, and means for successively placing transverse wires across said strands and between the wheels of said pairs at an angle to said strands differing from 90°, whereby a transverse wire is between wheels of different pairs at different instants.

2. In a machine for fabricating welded wire fabric, a plurality of pairs of welding wheels, means for feeding a wire strand between the wheels of each pair, said pairs of welding wheels being staggered with respect to a line extending at right angles to said strands, and means for successively placing transverse wires across said strands and between the wheels of said pairs at an angle of substantially 90° to said strands.

3. In a machine for fabricating welded wire fabric, a plurality of pairs of welding wheels, means for feeding a wire strand between the wheels of each pair, a plurality of feed wheels, means for placing transverse wires in peripherally spaced relationship on said feed wheels, means to rotate said feed wheels to bring said transverse wires to said strands, and means for releasing each transverse wire from said feed wheels when the transverse wire is in contact with said strands and between said welding wheels.

4. In a machine for fabricating welded wire fabric, a plurality of pairs of welding wheels, means for feeding a wire strand between the wheels of each pair, said pairs of welding wheels being in alignment on a line extending at right angles to said strands, a plurality of feed wheels, means for placing transverse wires in peripherally spaced relationship on said feed wheels at an angle to the axis of said feed wheels, means to rotate said feed wheels to bring said transverse wires to said strands, and means for releasing each transverse wire from said feed wheels when the transverse wire is in contact with said strands and substantially between said welding wheels.

5. In a machine for fabricating welded wire fabric, a plurality of pairs of welding wheels, means for feeding a wire strand between the wheels of each pair, said pairs of welding wheels being staggered with respect to a line extending at right angles to said strands, a plurality of feed wheels, means for placing transverse wires in peripherally spaced relationship on said feed wheels parallel to the axis of said feed wheels, means to rotate said feed wheels to bring said transverse wires to said strands, and means for releasing each transverse wire from said feed wheels when the transverse wire is in contact with said strands and substantially between said welding wheels.

6. In a machine for fabricating welded wire fabric, a plurality of pairs of welding wheels, means for feeding a wire strand between the wheels of each pair, said pairs of welding wheels being in alignment on a line extending at right angles to said strands, means for successively placing transverse wires across said strands and between the wheels of said pairs at an angle to said strands differing from 90°, whereby a transverse wire is between wheels of different pairs at different instants, and means for connecting said pairs of welding wheels in parallel across a source of electric current.

7. In a machine for fabricating welded wire fabric, a plurality of pairs of welding wheels, means for feeding a wire strand between the wheels of each pair, said pairs of welding wheels being staggered with respect to a line extending at right angles to said strands, means for successively placing transverse wires across said strands and between the wheels of said pairs at an angle of substantially 90° to said strands, and means for connecting said pairs of welding wheels in parallel across a source of electric current.

8. In a machine for fabricating welded wire fabric, a plurality of pairs of welding wheels, means for feeding a wire strand between the wheels of each pair, a plurality of feed wheels, each feed wheel being formed with a plurality of equally spaced recesses around its periphery, means for placing a transverse wire in corresponding recesses in the different feed wheels, means for rotating said feed wheels to bring said transverse wire to said strands, and means for releasing the transverse wire from said recesses when the transverse wire is in contact with said strands and between said welding wheels.

9. In a machine for fabricating welded wire fabric, a plurality of pairs of welding wheels, means for feeding a wire strand between the wheels of each pair, a plurality of feed wheels, a plurality of magnets equally spaced around the periphery of each feed wheel, means for placing a transverse wire in magnetic relationship with corresponding magnets of the different feed wheels, means for rotating said feed wheels to bring said transverse wire to said strands, and means for stripping the transverse wire from said magnets when the transverse wire is in contact with said strands and between said welding wheels.

10. In a machine for fabricating welded wire fabric, a plurality of pairs of welding wheels, means for feeding a wire strand between the wheels of each pair, a plurality of feed wheels, a plurality of magnets equally spaced around the periphery of each feed wheel, means for placing a transverse wire in magnetic relationship with corresponding magnets of the different feed wheels, means for rotating said feed wheels to bring said transverse wire to said strands, and magnets permanently located adjacent to where said strands pass between said welding wheels for counteracting the magnetic effect of the magnets on said feed wheels to thereby strip the transverse wire from the latter magnets when the transverse wire is in contact with said strands and between said welding wheels.

11. In a machine for fabricating welded wire fabric, a plurality of pairs of welding wheels, one wheel of each pair having a plurality of peripherally spaced projections, means for feeding a wire strand between the wheels of each pair, a plurality of feed wheels, means for placing transverse wires in peripherally spaced relationship on said feed wheels, means to rotate said feed wheels to bring said transverse wires to said strands, means for releasing each transverse wire from said feed wheels when the transverse wire is in contact with said strands and between said welding wheels, and means for rotating the welding wheels having said projections in timed relationship to said feed wheels so that a projection on each wheel contacts a strand when a transverse wire is between the welding wheels pertaining to that strand.

THEODORE HARRY WICKWIRE, Jr.